Jan. 9, 1934.   N. M. BAKER   1,942,393

AVIATOR'S GOGGLES

Original Filed June 15, 1927

INVENTOR
BY Nelson M. Baker.
Harry H. Styll
ATTORNEY

Patented Jan. 9, 1934

1,942,393

UNITED STATES PATENT OFFICE 1,942,393

AVIATOR'S GOGGLES

Nelson M. Baker, Southbridge, Mass., assignor to American Optical Company, Southbridge, Mass., a voluntary association of Massachusetts Original application June 15, 1927, Serial No. 199,013. Divided and this application May 21, 1929. Serial No. 364,794

4 Claims. (Cl. 88—43)

This invention relates to improvements in goggles and the like and has particular reference to a goggle used for the purposes of aviation.

This application is a division of my application Serial Number 199,013 filed June 15, 1927.

The principal object of the invention is to provide a properly centered pair of lenses with adjustable means for holding them rigidly in proper relation to the eyes of the wearer.

Another object of the invention is to provide a pair of wide vision lenses with means for holding them rigidly in proper relation to the eyes of the wearer.

Another object of the invention is to provide readily adjustable means that will hold the lenses rigidly in aligned position when adjusted to the facial requirements of the wearer.

Another object of the invention is to provide improved means for regulating the distance between the lenses and for locking the same rigidly to the regulated distance.

Another object of the invention is to provide improved means for adjusting the lenses and the eye cups of the whole goggle to the facial requirements of the wearer and securing the same in such adjusted position.

Another object of the invention is to provide ductile means connecting the two lenses which may be readily bent to conform the eye cups to the facial requirements of the wearer.

Another object of the invention is to provide adjustable means on the members connecting the two lenses that may be centered with respect to the two lenses after the distance between the same has been fixed.

Other objects and advantages of the invention will become apparent from the following description taken in connection with the accompanying drawing and it will be understood that many changes may be made in the arrangements and details of parts without departing from the spirit of the invention as set forth in the accompanying claims. I, therefore, do not wish to be limited to the exact details shown and described, the preferred forms only having been shown by way of illustration.

Referring to the drawing.

Figure 1:
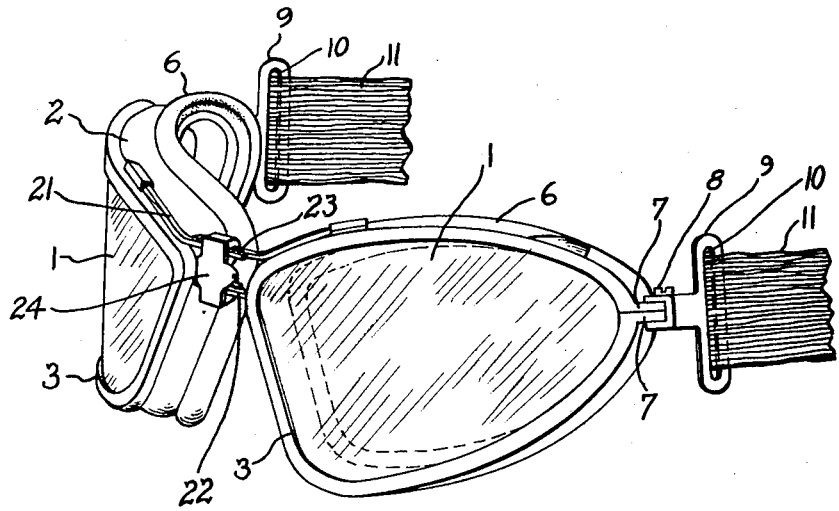
Fig. 1 is a perspective side and front view of the device of the invention.
Figure 2:
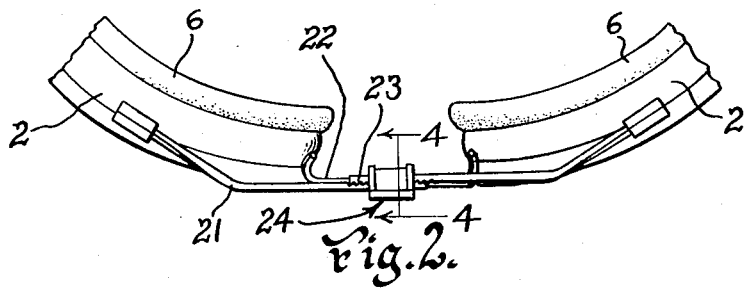
Fig. 2 is a top or plan view of the said device.

Up to the present time it has been customary to provide aviation and other types of protection goggles with the so-called plano or no power lenses. It has been found, however, in lenses of this type that there were distortions and refractive errors present and that to obtain the ideal conditions for the wearer's eyes the lenses should be designed with a proper center and should be held securely before the eyes of the wearer in this centered position. Lenses of this character have been recently designed by the assignee of this application and it is one of the objects of this invention to provide suitable holding means for these lenses. It has also been customary to make aviation goggles with a so-called hinged bridge or connecting member. It is clear that with a loose or hinged bridge connection the required relationship between the lenses and the eye cannot be maintained. The present invention has been designed to overcome this difficulty.

Another objection to aviation goggles has been the limited field of vision. In the present invention the widest possible range of vision has been obtained with centered lenses which are rigidly and accurately secured in proper alignment with the eyes of the wearer.

Referring to the drawing in which similar characters of reference are used to denote corresponding parts throughout, a pair of properly centered and designed wide vision lenses 1 are mounted in an eye cup frame 2 having a front flange or lens retaining seat 3. The frame 2 is shaped in general contour to that of the orbital arch of the wearer's face. On the inside of the eye cup frame 2 and spaced therefrom is a retaining frame 4. Between the frame 2 and the retaining frame 4 is a projecting portion 5 of a resilient face contacting member 6. This face contacting member is preferably of rubber or other soft and resilient contacting substance. The resilient member 6 is held between the members 2 and 4 either by sewing through the projecting portion 5, or cementing, riveting or other means. The projecting portion 5 is also subject to a clamping action because of the bringing together of the end pieces 7 of the frame 2 by means of the holding screw 8 which carries the head band or temple connection 9 which is pivoted on the screw 8, as clearly indicated in section in Fig. 1. The temple connection 9 is slotted at 10 and an elastic head band 11 is entered through the opening 10 and secured in place around the member 9 by sewing or otherwise. The elastic head band 11 may be provided with a buckle or other means for adjusting it to the head of the wearer.

Figures 3, 4, 5:
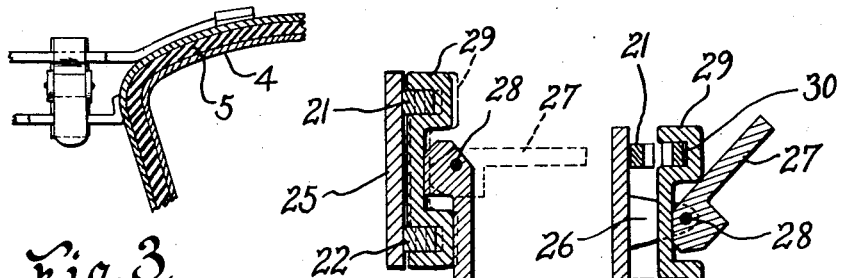
Fig. 3 is a fragmentary rear view of the bridge means.
Fig. 4 is a cross section on line 4—4 of Fig. 2 looking in the direction of the arrows.
Fig. 5 is a view similar to Fig. 4 showing the jaws in open instead of closed position.

The eye cup frames 2 are connected with each other by two ductile bridging or spacing members 21 and 22, respectively, 21 being the upper connection, and 22 the lower connection. Both the connecting members 21 and 22 are divided and overlap each other, being provided in the way of their overlapping portions with the teeth 23 which inter-engage each other. The ends of these members opposite their overlapping portions are soldered or otherwise secured to the eye cup frame 2. These members are ductile so that they may be bent by the exertion of pressure, but they are rigid enough to maintain the two eye cup frames in adjusted position from which they are not readily deflected. Interengaging with the bridge members 21 and 22 is a clamping member 24. This clamping member 24 comprises a supporting plate 25 having the projecting ears 26 to which is pivoted a lever 27 at the pivot 28. The lever 27 is a cam lever, as shown in Fig. 5. Overlying the supporting plate 25 and spaced therefrom is the clamp plate 29 having recesses 30 to receive the bridging members 21 and 22, as the case may be. The clamping member 29 lies between the plate 25 and the cam lever 27. It will be clear that when the cam lever 27 is pushed down in the position shown in Fig. 4 the clamp plate 29 is forced down tightly over the bridging members 21 and 22 locking them securely in place by means of their interengaging teeth 23. When the lever 27 is pushed up as shown in Fig. 5 the teeth of the overlapping portions of the bridging members 21 and 22 may be withdrawn from engagement and the members 21 and 22 may be slid along to change the distance between the eyecup frames. When the lever 27 is in an intermediate position between the closed or clamping one and the open or sliding one, the clamping member 24 as a whole may be slid on the bridging members 21 and 22 to position the clamping member 24 midway between the eyecups 2. It will be clear that the clamping member 24 provides for three distinct operations; one, to lock the bridging members 21 and 22 rigidly in clamped position; second, to allow the bridging members 21 and 22 to be slid along to lengthen or shorten the distance between the two eye cup frames 2; and third, after the proper adjustment between the eye cup frames has been made to position the clamp member 24 as a whole midway between the two eye cup frames.

It will also be clear that as the members 21 and 22 are ductile, these members may be bent or adjusted by bending to more securely and snugly fit the eye cup frames 2 to the facial requirements of the wearer, thus providing means of adjustment that will position the two lenses in their required relationship to the eyes of the wearer and hold them securely in this position.

It will be noted, Fig. 1, that the upper bridging member 21 in the left hand eye cup as shown in the drawing has the overlapping portion on the outer side, that is, the side away from the eye of the wearer, whereas the lower bridging member 22 for the left hand eye cup as shown in the drawing has the overlapping portion on the side towards the eye of the wearer. In other words, the bridging portions of one eye cup have one bridging member on the outside and the other on the inside of the overlapping connection.

From the foregoing description it will be seen that I have provided simple, efficient and inexpensive means for carrying out all the objects of the invention and that I have provided ready and facile means of adjusting such a goggle to the facial requirements of the wearer and then locking the parts in such a way as to make them rigidly maintain the said relationship.

Having described my invention, I claim:

1. In a device of the character described, means for holding a pair of lenses, a bridge member secured to each of the lens holding means and extending towards the other lens holding means and overlying each other and clamping means embracing the overlying members comprising a supporting plate in contact with one of the bridge members, said plate having an extension extending beyond the other bridge member, a cam plate pivoted on the extension and a movable clamp plate between the cam and adjacent bridge member said cam being adapted to move the clamp plate against the adjacent bridge member and to lock it there to hold the bridge members in adjusted position.

2. In a device of the character described, means for holding a pair of lenses, a bridge member secured to each of the lens holding means and extending towards the other lens holding means and overlying each other and clamping means embracing the overlying members comprising a supporting plate in contact with one of the bridge members, said plate having an extension extending beyond the other bridge member, a cam plate having a lever handle pivoted on the extension and a movable clamp plate between the cam and adjacent bridge member said cam being adapted to move the clamp plate against the adjacent bridge member and to lock it there to hold the bridge members in adjusted position.

3. In a device of the character described, means for holding a pair of lenses, a bridge member secured to each of the lens holding means and extending towards the other lens holding means and overlying each other and having members interengaging with each other and clamping means embracing the overlying members comprising a supporting plate in contact with one of the bridge members, said plate having an extension extending beyond the other bridge member, a cam plate pivoted on the extension and a movable clamp plate between the cam and adjacent bridge member said cam being adapted to move the clamp plate against the adjacent bridge member and to lock it there to hold the bridge members in adjusted position.

4. In a device of the character described, means for holding a pair of lenses, a bridge member secured to each of the lens holding means and extending towards the other lens holding means and overlying each other and clamping means embracing the overlying members comprising a supporting plate in contact with one of the bridge members, said plate having an extension extending beyond the other bridge member, a cam plate pivoted on the extension and a movable clamp plate between the cam and adjacent bridge member and having a recessed portion into which the adjacent bridge member extends said cam being adapted to move the clamp plate against the adjacent bridge member and to lock it there to hold the bridge members in adjusted position.

NELSON M. BAKER.